W. F. TESNOW.
WIND SHIELD CLEANER.
APPLICATION FILED FEB. 5, 1916.
1,199,509.
Patented Sept. 26, 1916.
2 SHEETS—SHEET 1.
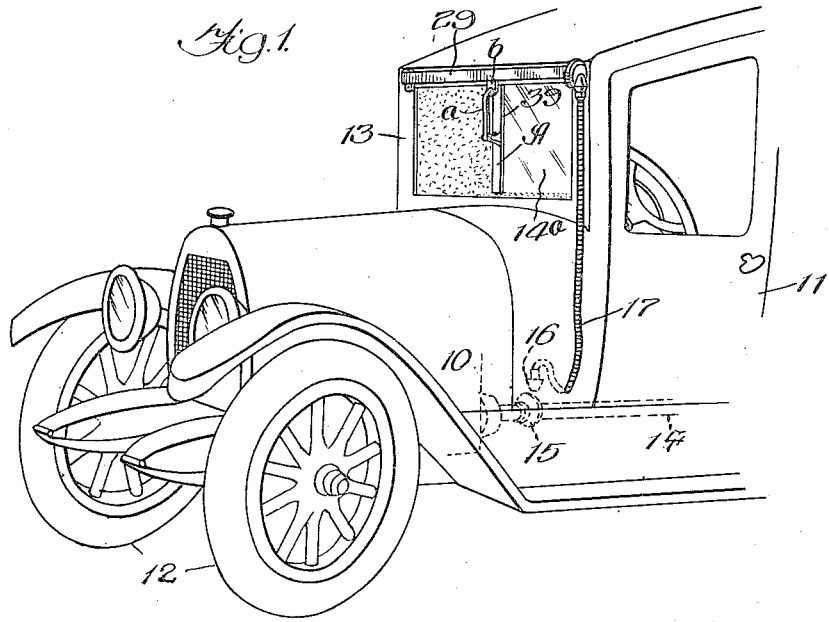
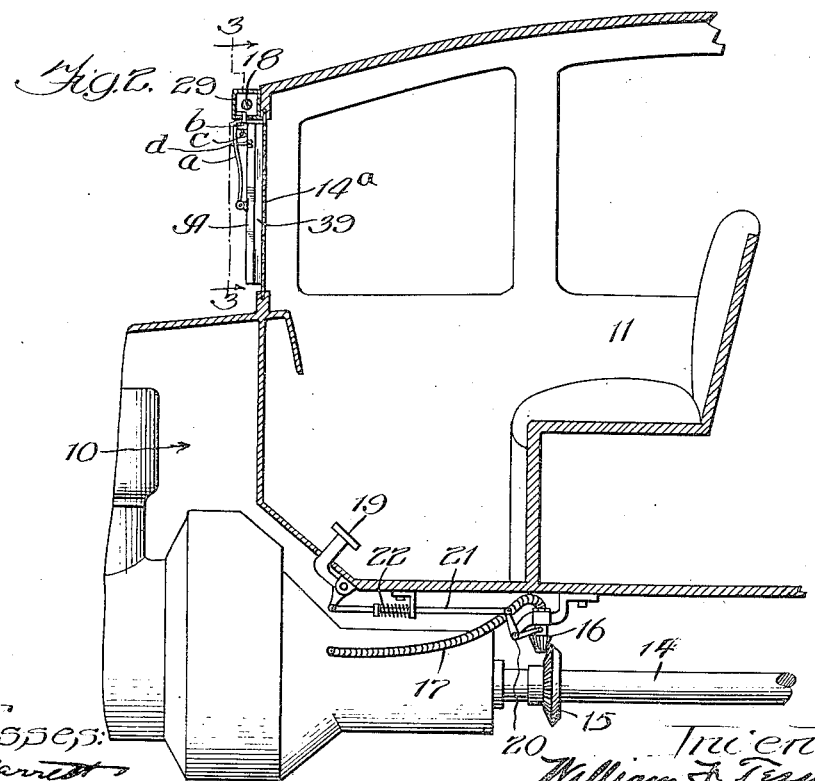

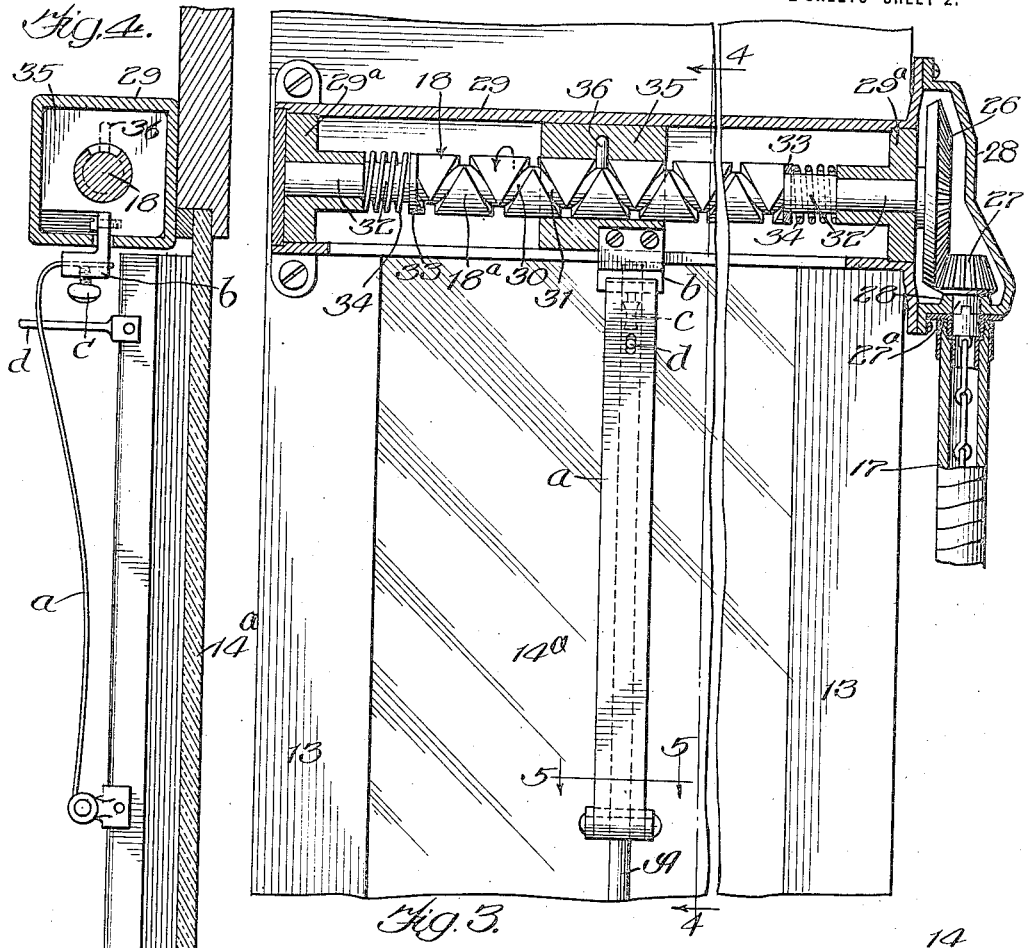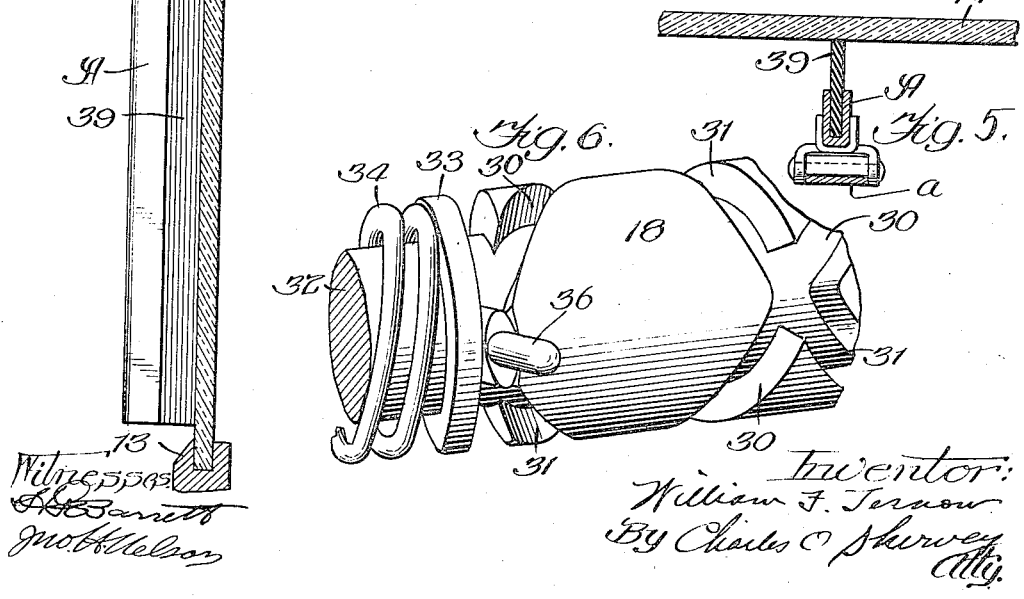

UNITED STATES PATENT OFFICE.

WILLIAM F. TESNOW, OF CHICAGO, ILLINOIS.

WIND-SHIELD CLEANER.

1,199,509.     Specification of Letters Patent.     Patented Sept. 26, 1916.

Application filed February 5, 1916. Serial No. 76,267.

*To all whom it may concern:*

Be it known that I, WILLIAM F. TESNOW, a citizen of the United States, residing at Chicago, in the county of Cook and State of Illinois, have invented new and useful Improvements in Wind-Shield Cleaners, of which the following is a specification.

This invention relates to wind-shield cleaners, and has for its main object the production of a wind-shield cleaner, automatic in operation, and under the control of the driver.

It is well known that in rainy or stormy weather, the transparent wind-shields of power-driven vehicles, such as automobiles, motor vehicles, trolley cars, locomotives, and the like are apt to become covered with moisture, sleet, or snow as the case may be, thereby preventing the driver from obtaining a clear view of the road in front of the vehicle.

One of the objects of this invention is to provide a cleaner, capable of being set in motion at the will of the driver, and having a "squeegee" or other suitable cleaning tool, movable across the outer surface of the wind-shield glass, and operatively connected with some rotary portion of the vehicle in such manner that the rotary motion is converted into a reciprocatory motion of the cleaning tool, thereby causing it to travel across the face of the glass, whereby the accumulated matter may be readily removed.

The invention consists in the several novel features hereinafter set forth and claimed.

In the drawings furnished herewith Figure 1, is a perspective view of a fragment of an automobile, showing the preferred form of my invention applied thereto; Fig. 2, is a vertical section of a fragment of an automobile body, and other parts of said automobile showing the wind-shield cleaner thereon; Fig. 3, is a detail vertical section taken on line 3—3 of Fig. 2; Fig. 4 is a detail vertical section taken on line 4—4 of Fig. 3; Fig. 5, is a detail horizontal section taken on line 5—5 of Fig. 3; and, Fig. 6, is a perspective view of a fragment of a certain worm gearing, showing the same upon a greatly enlarged scale.

Referring to said drawing, 10, designates a power driven vehicle, here shown as comprising an automobile, having the usual body 11, carried by wheels 12, and provided with a wind shield 13, having a transparent plate 14ª, usually constructed of glass.

In the embodiment of the invention illustrated, the cleaner is driven from one of the rotary elements of the automobile, for instance the shaft 14, but it is quite obvious that it may be driven from other rotary parts, such as the supporting wheels, axles or the like. As shown a pinion 16, is journaled in a bracket carried by the frame of the vehicle 10, and is arranged to mesh with a gear wheel 15, on the drive shaft 14, and the shaft of said pinion 16, is extended in the form of a flexible shaft 17, running to the tool driving worm shaft 18. The shaft 17, under normal conditions is stationary, the pinion 16, being out of mesh with the gear wheel 15, and for imparting rotary motion to said shaft 17, I provide a bell crank lever 20, operatively connected with the pinion 16, and a foot pedal 19, connected to one arm of said bell crank lever by a link 21. A spring 22, confined under compression between a projection on the link and a bracket, which extend down from some stationary portion of the automobile operates to hold the foot pedal in raised position, and the pinion 16, out of mesh with the gear wheel 15. The parts are so proportioned and arranged that pressure upon the pedal acts to throw the pinion into mesh with the gear wheel, and the release of the pedal operates to demesh the two.

The worm shaft 18, and shaft 17, are geared together by beveled pinions 26, 27, fast upon the shafts 18 and 17, respectively, and the stud shaft 27ª of the pinion 27, is journaled in a gear housing 28, which forms part of a housing 29, secured to the frame of the wind-shield, and said pinion 27, has any of the ordinary and well known forms of connections with the flexible shaft 17. The worm shaft 18, is journaled in bearings 29ª secured in the housing 29, and the cylindrical face of its main portion 18ª, is formed with right and left spiral grooves 30, 31, which extend to the ends of said main portion 18ª. The shaft 18, is reduced in diameter beyond the main portion 18ª as seen at 32, and slidably mounted on said reduced portions are washers 33, that are spring pressed against the shouldered ends of the main portion 18ª, by coiled springs 34, that encircle the reduced end portions 32. The cleaning tool A, is secured to a flat spring pressure member a, near its middle, and said flat spring is detachably secured in an arm, b, that is carried by a sleeve or block 35, non-rotatively mounted in the housing 29, and running on the worm screw 18. As shown, the arm b, is screwed to the block 35, and projects down through a lengthwise running slot in the lower side of the housing; it has a slot for the reception of the flat spring and a clamp screw c, threaded in the arm b, bears against the spring a, to hold it in place. Said spring is put under tension so as to press the cleaning tool against the wind shield glass. A stud or pin d, projects out from the upper end of the cleaning tool, and passes through a hole in the flat spring to hold the cleaning tool in an upright position. Rotatively secured in said sleeve 35, is a pin 36, that projects into the hollow of said sleeve, and travels in the spiral grooves 30, 31, of the worm shaft, and as a result of the rotation of said worm shaft said pin, sleeve and the cleaning tool are moved across the wind-shield from one end to the other, depending upon the direction of rotation of the worm shaft, and the groove in which the pin is located.

Assuming that the shaft 18, is rotated in the direction of the arrow and the pin running in the grooves 30, the tool is therefore moved toward the right, as viewed in Fig. 2. As soon as the pin, 36, strikes the washer near the end of its travel it moves said washer along the reduced portion of the shaft 18, and compresses the spring. As soon as the pin runs out of the groove, 30, the compressed spring tends to push the pin back and the moment that the open end of the other groove 31, registers with the pin, the latter is forced thereinto, after which it follows said groove; the continued rotation of the shaft 18, causes movement of the tool in the reverse direction and this reciprocatory movement of the tool is maintained so long as rotation of the worm shaft is continued. As soon as the pedal is released and the gears thereby disconnected, rotation of the worm shaft 17, ceases and the cleaning tool is left stationary. In this manner the tool may be caused to move once or more times across the face of the glass as desired.

The tool A, extends transversely across the face of the pane of glass, and in accordance with the ordinary "squeegee" is provided with a strip of rubber or other flexible material 39, the exposed edge of which contacts with the face of the glass and wipes the same as it moves across it. The flat spring holds said edge of the squeegee in contact with the glass plate. The squeegee may be detached from the arm b, in case it becomes desirable to remove the same, by unscrewing the clamp screw, and detaching the spring from the arm.

The operation of the device is readily apparent from the above description. By pressing down upon the pedal the flexible shaft is set in motion, the worm shaft is rotated through the instrumentality of the beveled pinions, and the cleaning tool is moved back and forth across the outer face of the glass plate, so long as the gears remain in meshed condition, thus wiping off any moisture, sleet or snow that may have accumulated on the outer face of the glass plate. Release of the pedal causes a stoppage of the cleaning tool.

It is obvious, that when the device is applied to other forms of automobiles, or to other motor cars, trolley cars, locomotives and the like, certain mechanical alterations and modifications are necessary to adapt it to the particular conveyances. I do not, therefore, desire to limit myself to the exact form of construction shown and described except as may be necessitated by the state of the art.

I claim as new and desire to secure by Letters Patent:

1. In a wind-shield cleaner of the class described, the combination of a horizontally reciprocating cleaning tool, a single rotary worm shaft supporting said tool, additional means for holding said tool in contact with the glass plate of a wind-shield, said worm being arranged to move said tool back and forth across the glass plate, continuously rotating driving means, a driven shaft geared to said worm shaft, and pedal operated connecting mechanism between said driving means and driven shaft.

2. In a wind-shield cleaner of the class described, the combination of a horizontally reciprocating cleaning tool having a rubber strip arranged to contact with the glass plate of a wind-shield, and having a sleeve with a pin therein, a single tool supporting worm shaft extending through said sleeve with the pin seated in the groove of the worm shaft, a housing over said sleeve operating to hold said sleeve non-rotatively with respect to the worm shaft, a power driven flexible shaft geared to said worm shaft, and a pedal controlled mechanism on said flexible shaft for throwing said flexible shaft into gear with a driving element.

3. In a wind-shield cleaner of the class described, the combination of a single tool supporting worm shaft, means for rotating said worm shaft, a housing in which said worm shaft is contained, a sleeve non-rotatively secured in said housing encircling said worm shaft, said sleeve having a pin traveling in the groove of the worm shaft, a squeegee and a flexible connection between said sleeve and squeegee adapted to press the squeegee against the glass of a wind-shield.

4. In a wind-shield cleaner of the class described, the combination of a single worm shaft, driving means therefor, a sleeve non-rotatively mounted on said shaft, and having a pin traveling in the groove thereof, and a spring pressed squeegee detachably connected with said sleeve.

WILLIAM F. TESNOW.